June 29, 1965  C. E. KIRKWOOD ETAL  3,191,628
MULTI-PORT VALVE
Filed Jan. 18, 1963  3 Sheets-Sheet 1

INVENTORS:
CREAL E. KIRKWOOD
BERNARD M. MORONEY

BY *Head & Johnson*

ATTORNEYS

INVENTORS:
CREAL E. KIRKWOOD
BERNARD M. MORONEY

BY Head & Johnson

ATTORNEYS

INVENTORS:
CREAL E. KIRKWOOD
BERNARD M. MORONEY

BY *Head & Johnson*

ATTORNEYS

United States Patent Office 3,191,628
Patented June 29, 1965

3,191,628
MULTI-PORT VALVE
Creal E. Kirkwood, 1423 S. 103 East Ave., and Bernard M. Moroney, 1520 E. 19th, both of Tulsa, Okla.
Filed Jan. 18, 1963, Ser. No. 252,501
8 Claims. (Cl. 137—625.43)

This invention relates to a multi-port valve. More particularly, the invention relates to a valve having a multiplicity of ports and a rotatable gate member therein for directing the direction of flow of two separate fluid streams.

In some types of industrial applications it is necessary to control the direction of flow of two separate fluid streams simultaneously. A specific application requiring this type of valving arrangement is found in meter checking systems wherein fluid flow from the meter must be directed for a relatively short interval through a testing device and at the end of the testing interval the direction of fluid flow must be altered away from the testing device. The direction of fluid flow into and out of the checking system must be controlled simultaneously. This is normally accomplished by the use of typical single action valves, such as butterfly valves, arranged in a manifold with the valve control levers interconnected.

The use of manifold valves has several disadvantages. First, it is exceedingly expensive. Not only the extra expense of the multiplicity of valves is involved, but the fittings and connection work necessary to place them in proper manifold relationship is costly. Second, when valves are manifolded, accuracy of the system depends on the careful interlinkage of the valves so that the closing and opening of valves occur substantially simultaneously in the various valves. The accurate interlinkage of the manifolded valves is expensive to provide. Third, when valves are manifolded together in certain arrangements fluid flow is interrupted for a moment of time as the valves are shifted from one position to another. Such fluid flow interruption causes pressure surges which can be detrimental to many types of equipment connected to the line.

To overcome the problems with manifolding together valves to achieve control of the direction of more than one fluid stream simultaneously, this invention provides a multi-port valve which can simultaneously direct two separate fluid flow streams. It is therefore a main object of this invention to provide a mutli-port valve adaptable for controlling the direction of two or more streams of fluid flow simultaneously. Another object of this invention is to provide a multi-port valve which is exceedingly simple and straight forward in design and construction and which therefore is substantially trouble free and is economical to produce.

Another object of this invention is to provide a multi-port valve including means of testing the valve while it is in use to make certain that the valve is functioning perfectly and that no fluid leakages are occurring between one stream and the other within the valve.

These and other objects and a better understanding of the invention may be had by referring to the following description and claims taken in conjunction with the attached drawings in which:

This invention may be defined as a multi-port valve. More particularly, but not by way of limitation, this invention may be defined as a multi-port valve comprising, a tubular body member closed at each end thereof, said body member having a multiplicity of fluid communicating openings in the tubular wall thereof, a gate member positioned in said tubular body member, said gate member defined by a substantially flat parallel sided main portion, the plane thereof paralleling the tubular axis of said body member, a, first semi-circular substantially flat integrally formed wing portion extending from said main portion at one end thereof in a plane substantially perpendicular the plane of said main portion, and a second semi-circular substantially flat integrally formed wing portion extending from said main portion at the opposite end thereof in a plane substantially perpendicular the plane of said main portion, said second wing portion extending in a direction opposite said first wing portion, the parallel sides of said main portion and the periphery of said first and second wing portions forming a continuous contacting surface in fluid tight engagement with the total interior circumference of said body member, means of axially and rotatably supporting said gate member in said body member, and external means of selectably positioning said gate member.

Figure 1:
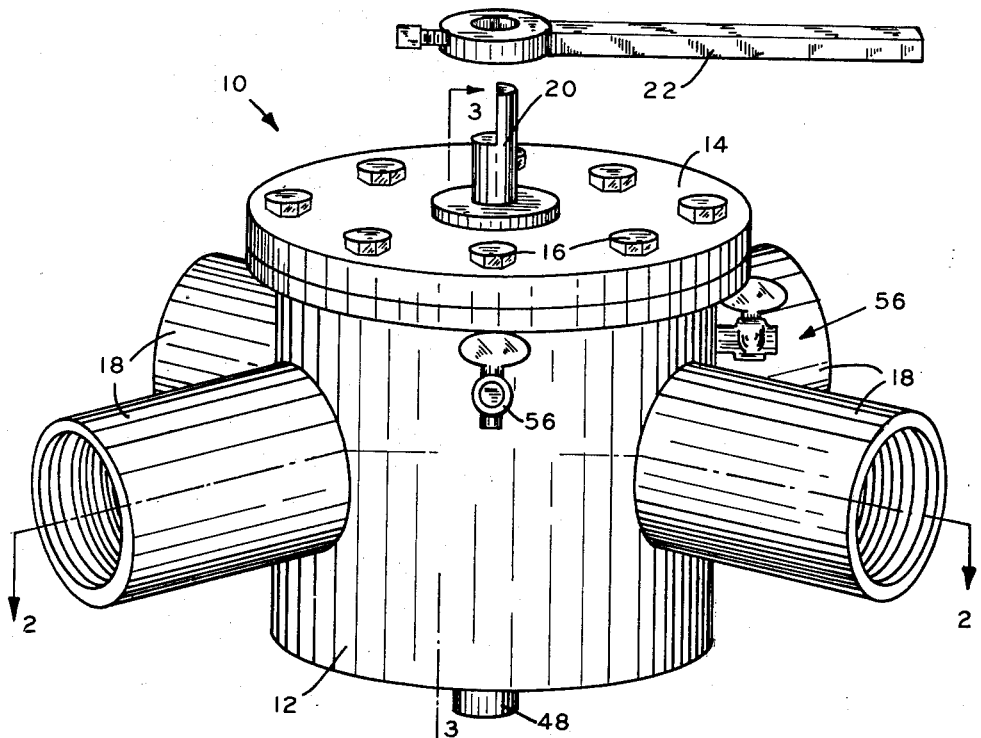
FIGURE 1 is an isometric external view of the preferred embodiment of the invention showing a four port valve.

Referring now to the drawings and first to FIGURE 1, the multi-port valve of this invention is indicated generally by the numeral 10. The main structural member of the valve is a tubular body portion 12 which is closed at both ends, preferably being closed at the top with a plate 14 held in position with bolt 16. Although the novel features of this invention adapt themselves to a valve having three or more ports, the preferred embodiment is as shown in FIGURE 1, that is, a multi-port valve having four ports, the ports being provided with a means for connecting fluid flow lines thereto, such as the provision of the integrally formed collars 18. Extending through an opening in plate 14 is an upper axial stem 20 by which the valve is externally controlled, such as by means of a handle 22.

Figure 2:
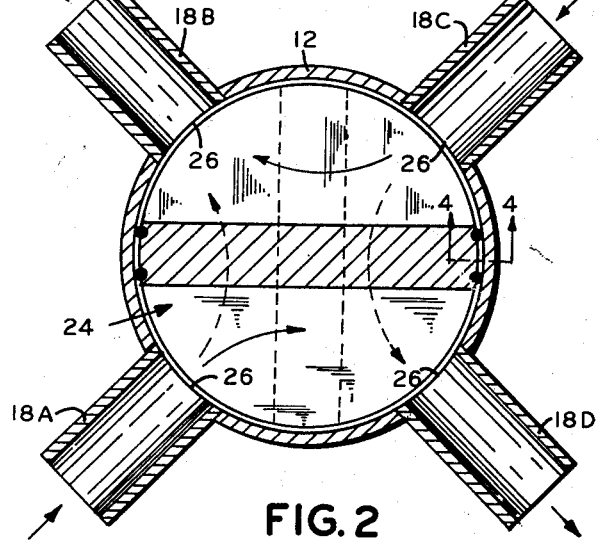
FIGURE 2 is a cross-sectional view taken along the line 2—2 of FIGURE 1 showing some of the internal arrangements of the valve and showing how the valve is utilized to control the direction of flow of two separate fluid streams.

Referring to FIGURE 2, the basic function of the valve is best shown. As has been previously stated, the primary object of this invention is to provide a multi-port valve for simultaneously directing and controlling the flow of two or more fluid systems. Supported within the tubular body portion 12 is a gate member generally indicated by the numeral 24 which will be described in greater detail subsequently. The collars 18, which are indicated as 18A through 18D, each communicates with the tubular body portion 12 through a port opening 26. The gate member 24 serves, according to its position, to interconnect two of the port openings 26 and to serve as a partition against the other two port openings. Thus, in the attitude of the gate member as shown in solid lines, fluid may flow into the valve from collar 18A and flow out through 18D. At the same time, without the fluid being co-mingled in any way, fluid may flow into the valve through collar 18C and out through 18B. When the gate member 24 is rotated by 90°, such as is shown in dotted lines, the fluid flow will then take place as shown by the dotted arrows, that is, fluid will then flow in through collar 18A and out through 18B and in through 18C and out through 18D.

The arrangement shown in FIGURE 2, with four port openings 26, is preferred and is deemed the most useful embodiment of the invention. It can be seen that a multitude of various arrangements can be made utilizing the same principles of this invention. For instance, referring to FIGURE 9, three port openings are shown communicated to by collars 18A through 18C. As an example of the use of the arrangement of FIGURE 3, fluid can flow in through 18A and, according to the position of the gate member 24 as shown, would flow out through 18C. Fluid flow through collar 18B is blocked. When the gate member 24 is rotated by approximately 90°, as shown in the dotted lines, fluid will then flow into the valve through collar 18A and out through 18B with the collar 18C being blocked.

Figure 10:
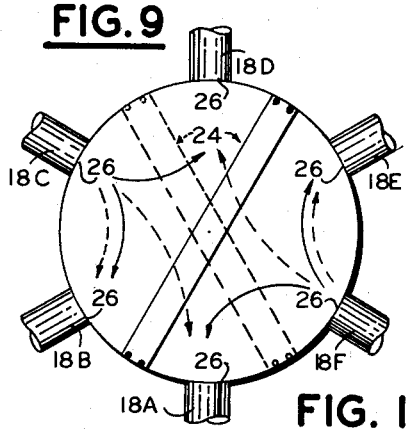
FIGURE 10 is a diagrammatic cross-sectional view showing the fluid flow paths in a valve according to this invention having six ports.

Referring to FIGURE 10, a six port valve is shown, the solid arrows indicating the various directions fluid flow could take according to the setting of the gate member 24, and the dotted arrows showing the possible directions fluid flow could take when the gate member is rotated by 60°.

Figure 3:
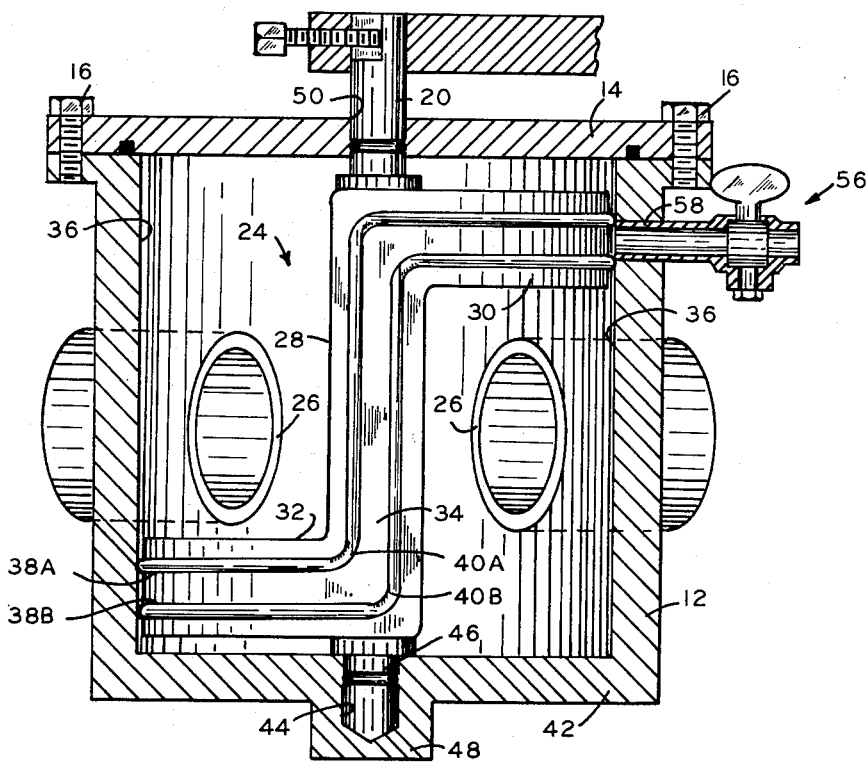
FIGURE 3 is a cutaway view taken substantially along the line 3—3 of FIGURE 1 showing the walls of the valve cutaway to expose the gate member.
Figure 9:
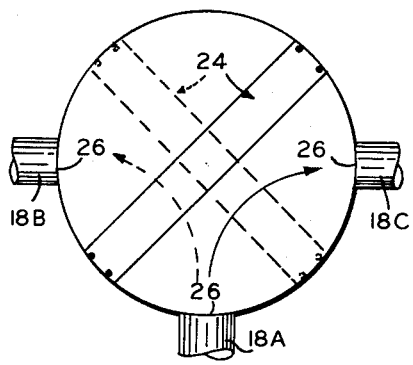
FIGURE 9 is a diagrammatic cross-sectional view showing the fluid flow paths of a valve according to this invention having three ports.

The multi-port arrangements of FIGURE 2, FIGURE 9 and FIGURE 10 are only suggestive of the various arrangements which could be made utilizing the basic concept of the valve of this invention. The main and principal novelty of this invention lies not so much in the multi-port arrangements but rather in the novel construction of the gate member, the construction being best shown in FIGURES 3 and 5. Referring to FIGURE 3, the valve is shown, and the gate member 24 is shown in position in the tubular housing portion 12. Gate member 24 is comprised of a parallel sided flat main portion 28, a first or upper semi-circular substantially flat integrally formed wing portion 30, and a second or lower semi-circular substantially flat integrally formed wing portion 32. The upper semi-circular wing portion 30 and the lower semi-circular portion 32 extend in opposite directions from each other as affixed to opposite ends of the main portion 28. The periphery of the upper and lower wing portions 30 and 32 and the parallel sides of the main portion 28 form a continuous contacting surface 34 which engages the total interior circumference of the tubular body portion 12, the contact between the continuous contacting surface 34 and the interior circumference 36 forming a liquid barrier.

Figure 4:
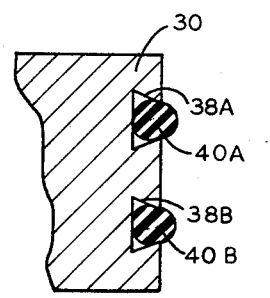
FIGURE 4 is a segmented cross-sectional view taken along the line 4—4 of FIGURE 2 showing the manner of the provision of grooves in the contact surface of the gate member.

In order to provide a more effective liquid barrier in the continuous contacting surface 34 of the gate member 24, a first and second continuous groove 38A and 38B is formed in the gate member 24, as best shown in FIGURE 4. Positioned in the grooves 38A and 38B are continuous gasket members 40A and 40B, which are preferably O-ring gaskets.

Referring again to FIGURE 3, the tubular body portion 12 is closed at the upper end with plate 14 and is closed at the lower end by the integrally formed end portion 42, although the end portion 42 can be easily replaced by the arrangement of a bolted plate as utilized to close the top member 14. Formed in lower end 42 is an axial recess 44 which receives a lower cantilevered axle 46 integrally formed to the gate member 24. Axial recess 44 is preferably formed in an integrally extending axial boss 48 which may be cast as a part of the tubular body portion 12. The upper axial stem 20 extends through an opening 50 in top plate 14, the openings 50 and 44 axially and centrally supporting the gate member 24 in the tubular body portion 12.

The arrangement of the valve of this invention provides a new method of sealing one fluid flow from another within the valve. The unique provision of the gate member 24 is such that only the tubular interior circumference of the body portion 12 is engaged for sealing purposes and this engagement is by continuous contacting surface 34 which is provided with continuous gasket members. No contact is required with the interior surfaces of the lower end 42 of the upper plate 14 which means that the valve can be simply cast and only the simple process of machining of the tubular interior surface 36 of the valve is necessary to provide a complete sealing surface.

Figure 6:
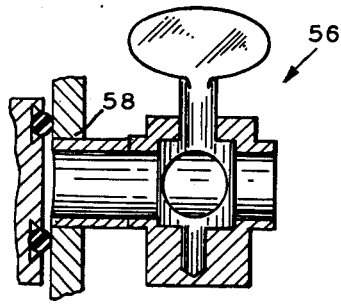
FIGURE 6 is a cross-sectional view of a portion of the valve showing the manner of use of a test valve according to one of the novel features of this nvention.
Figure 5:
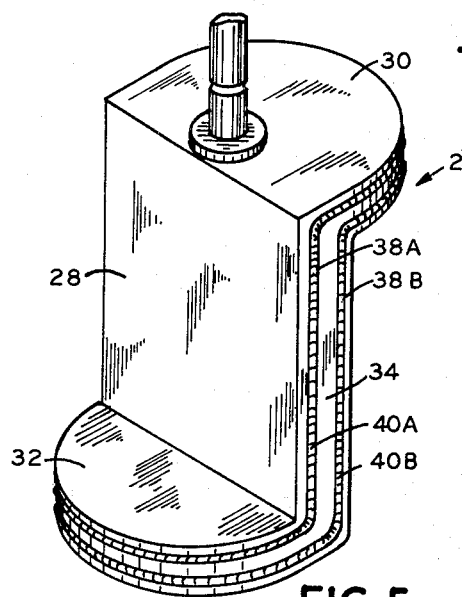
FIGURE 5 is an isometric view of the preferred embodiment of the gate member alone.
Figure 7:
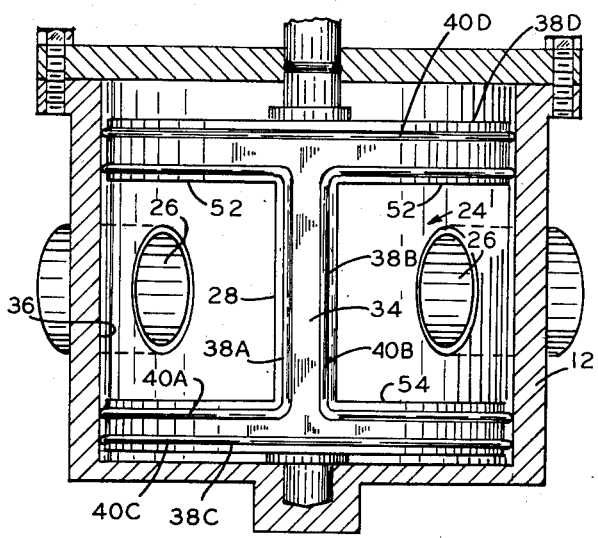
FIGURE 7 is a cutaway view of the valve showing an alternate embodiment of the gate member.
Figure 8:
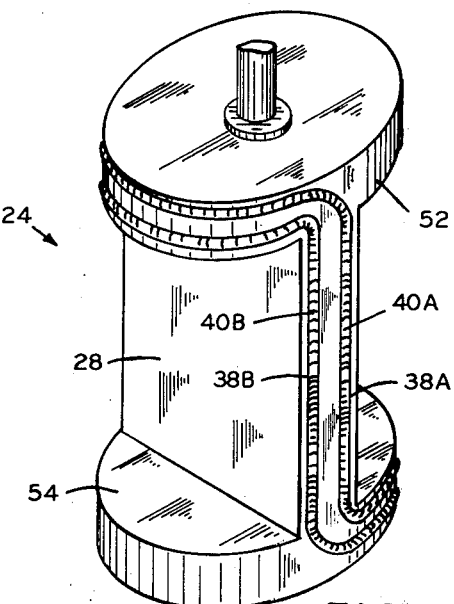
FIGURE 8 is an isometric view of the alternate gate member design.

An alternate arrangement of the gate member 24 is shown in FIGURES 7 and 8. In FIGURE 7 the gate member is substantially as shown in FIGURES 3 and 5 except that the main portion 28 of the gate member 24 is provided at its upper and lower end with circular substantially flat integrally formed with portions 52 and 54. In this arrangement two means are available for providing gaskets on the continuous contacting surface 34. In the arrangement of FIGURE 8, which shows the alternate embodiment of the gate member 24 isometrically, the grooves 38A and 38B and the gaskets 40A and 40B are arranged substantially as shown in FIGURE 3, utilizing two continuous gaskets. An alternate arrangement of grooves and gaskets is shown in FIGURE 7. In this arrangement four continuous grooves 38A through 38D and four continuous gaskets 40A through 40D are required. The arrangement of gate member 24 in either FIGURE 6 or FIGURE 7 provides means of full bearing support for the gate member to provide continuous and improved alignment of the gate member in the tubular body portion 12. The function otherwise of the valve remains the same and, as relates to FIGURE 3 and FIGURE 5, only the interior circumference 36 of the tubular body portion 12 is utilized as a sealing surface.

In many applications it is important to know that there is no co-mingling of the two fluids flowing through the valve. This is especially true in the specific application of the valve for use in meter proving where a high degree of accuracy of fluid measurement is required. A novel and important element of this invention is the provision of a means for readily ascertaining whether or not fluid leakage and therefore fluid co-mingling is occurring. This is accomplished by the provision of one or more test valves 56 as shown in FIGURES 1, 3 and 6. A test opening 58 is provided in the tubular body portion 12 for each of the best valves 56. The test opening 58 is positioned so that, in the position of the valve gate member 24 wherein the test is to be conducted, the gaskets 40A and 40B are to either side of the opening, that is, so that the test opening 58 communicates with the continuous contacting surface 34 between gaskets 40A and 40B.

When it is desired to test the valve, to make sure that no leakage is occurring, it is only necessary to open the test valve 56. If no fluid flow escapes out of the opened test valve 56 then it is known that no fluid leakage is occurring past either of the gaskets 40A or 40B and since no leakage is occurring past either gasket then no possible leakage can be occurring between one fluid flow and another within the valve.

The test valves 56 may be located at various positions on the tubular body portion 12, the positions being determined by the position of the gate member 24 at which it is desired to conduct a test for leakage.

The provision of test valves 56 is equally applicable to the arrangement of the gate member of FIGURE 3 or the alternate arrangement of FIGURE 7 or 8.

One novel and important inherent feature of the valve of this invention is that in the arrangement of FIGURES 2 and 10, as the gate member is rotated to change the direction of fluid flow in the valve, the fluid flow is never blocked but an outlet access always exists. This is true as long as the contact surface 34 of gate member 24 is narrower than the diameter of port openings 26. This novel characteristic prevents cessation of fluid flow as the valve is utilized to change the directions of fluid flow, preventing damaging pressure buildup and surges.

Gaskets 40 are shown as the O-ring type and this type of gasket is preferred, however it is understood that any other type of gaskets may be used. For instance, gaskets 40 may be of a square or rectangular cross-sectional configuration. Gaskets 40 may be bonded to the gate member 24.

This invention provides a new and novel type of multi-port valve for use in controlling the flow of two streams of fluid. The invention provides a valve utilizing continuous gasket means sealing against a continuous cylindrical surface in a manner so that the valve is very economically produced and is substantially fail-proof in operation. In addition, the invention provides a new and novel type of device for testing the valve to determine whether fluid leakage or fluid co-mingling is occurring within the valve.

Although this invention has been described with a certain degree of particularity, it is manifested that many changes may be made in the details of construction and the arrangement of components without departing from the spirit and scope of this disclosure.

What is claimed:

1. A multi-port valve comprising:
    a body having an internal cylindrical surface, the body having at least four port openings in the cylindrical surface;
    a gate member rotatably supported in the body dividing the interior of the body into separate flow chambers, the gate member having a continuous sealing surface therearound in close proximity to the internal cylindrical surface of the body;
    said gate member having at least two continuous gaskets in the sealing surface each providing sealed contact with the internal cylindrical surface of the body sealably separating the separate flow chambers, the gaskets being spaced apart from each other and forming a continuous, closed passageway therebetween, and wherein the body has a test opening therein of a diameter less than the median distance between the gaskets, the test opening communicating the closed passageway between the gaskets with the exterior of the body.

2. A multi-port valve according to claim 1 including a test valve exterior of the body closing the test opening.

3. A multi-port valve comprising:
    a tubular body member closed at each end and having at least four port openings in the tubular wall thereof;
    a gate member positioned in the tubular body member defined by a main portion substantially paralleling the tubular axis of the body member, a first semi-circular wing portion extending from the main portion at one end thereof in a plane substantially perpendicular to the plane of the main portion, and a second semi-circular wing portion extending from the main portion at the opposite end thereof in a plane substantially perpendicular to the plane of the main portion, the second wing portion extending in a direction opposite the first wing portion, the parallel sides of the main portion and the circular periphery of the first and second wing portions forming a continuous contact surface in close proximity with the total interior circumference of the tubular body member, the gate member dividing the interior of the body into two separate flow chambers;
    means of axially and rotatably supporting the gate member in the body member, the gate member including a first and second spaced apart continuous groove formed in the said continuous contact surface; and
    a continuous gasket member supported in each of the grooves, the said gasket members providing sealing contact between the gate member and the internal cylindrical surface of the tubular body member, the gaskets forming a continuous closed passageway therebetween, and a test opening in the tubular wall of the body member communicating with the closed passageway between said gaskets.

4. A multi-port valve according to claim 3 wherein the test opening is positioned to communicate with the closed passageway between the gaskets at the periphery of one of the semi-circular wing portions of the gate member.

5. A multi-port valve according to claim 3 including a test valve closing the test opening externally of the body member.

6. A multi-port valve comprising:
    a tubular body closed at each end, and having an internal cylindrical sealing surface and at least four port openings in the tubular wall thereof;
    a gate member positioned in the tubular body, the gate member defined by a substantially parallel sided main portion substantially paralleling the tubular axis of the body, a first circular wing portion at one end of the main portion, and a second circular wing portion at the opposite end of the main portion, the first and second circular portions extending in planes substantially perpendicular the plane of the main portion, the parallel sides of the main portion and the circular peripheries of the first and second wing portions forming a continuous sealing surface in close proximity with the interior circumference of the tubular body, the gate member dividing the interior of the body into separate flow chambers, the gate member having spaced apart continuous grooves formed in each of the parallel sides of the main portion and in the peripheries of each of the circular wing portions; and
    continuous gasket members supported in each of the grooves forming a single continuous closed passageway between said gaskets, and wherein the body has a test opening in the tubular wall thereof, the diameter of the test opening being less than the median distance between the gasket members, the test opening serving to communicate the closed passageway between the gaskets with the exterior of the body member.

7. A multi-port valve according to claim 6 wherein the test opening communicates with the closed passageway between the gaskets at the periphery of one of the circular wing portions.

8. A multi-port valve according to claim 6 including a test valve exterior of the body member closing the test opening.

References Cited by the Examiner

UNITED STATES PATENTS

| | | | |
|---|---|---|---|
| 1,519,205 | 12/24 | Kiefer | 137—625.43 XR |
| 2,414,966 | 1/47 | Melichar | 137—625.43 |
| 2,629,606 | 2/53 | Fraser | 137—312 |
| 2,695,036 | 11/54 | Kronheim | 137—625.21 XR |
| 3,050,077 | 8/62 | Wheatley | 137—312 |

M. CARY NELSON, *Primary Examiner.*